UNITED STATES PATENT OFFICE.

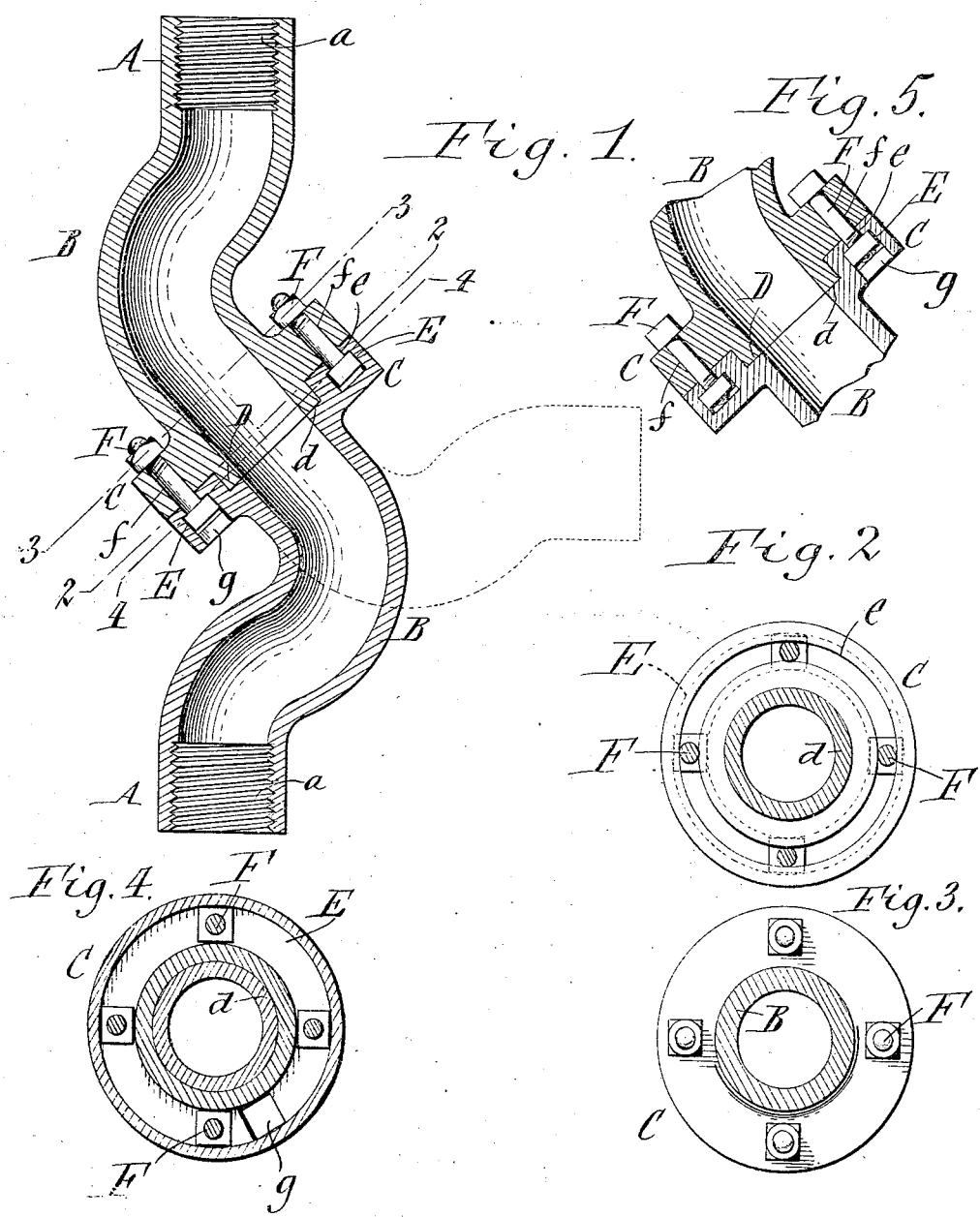

MILES A. CONNOR, OF LOCKPORT, NEW YORK.

PIPE-COUPLING.

931,914. Specification of Letters Patent. Patented Aug. 24, 1909.

Application filed July 9, 1906. Serial No. 325,256.

*To all whom it may concern:*

Be it known that I, MILES A. CONNOR, a citizen of the United States, residing at Lockport, in the county of Niagara and State of New York, have invented a new and useful Improvement in Pipe-Couplings, of which the following is a specification.

This invention relates to a pipe coupling and has the object to provide an improved coupling of this character whereby pipes arranged at varying angles relatively to each other may be readily and reliably connected.

In the accompanying drawings: Figure 1 is a longitudinal section showing my improved coupling as constructed for general use and one form of means for connecting the body sections. Figs. 2, 3 and 4 are transverse sections thereof in the correspondingly numbered lines in Fig. 1. Fig. 5 is a fragmentary section similar to Fig. 1 showing the clamping bolts reversed.

Similar letters of reference indicate corresponding parts throughout the several views.

The two pipe sections or nipples constituting the body of my improved pipe coupling consist each of a rear straight tubular shank A and a front curved tubular neck B. At its front end each body section is provided with an external annular flange C, the face of this end of the section and its flange being arranged at an oblique angle of preferably 45 degrees to the axis of the shank. The faces of the two body sections are adapted to bear against each other and the same are also capable of rotation relatively to each other in the plane of their faces so as to permit of adapting the body sections to the angle of the two pipes which are to be connected by the same. As shown in full lines in Fig. 1 the tubular shanks of the two body sections are axially in line in which position of the same they are adapted to couple two pipes which are in a corresponding position. Upon turning one body section of the coupling so that its shank is at right angles to the shank of the other section, as shown by dotted lines in Fig. 1, the parts are in position for connecting two pipes which are arranged at this angle relatively to each other. In like manner the body sections may be turned at different oblique angles relatively to each other so that their shanks may be connected with pipes arranged at such relative angles.

As shown in Fig. 1, one of the body sections is preferably provided on its face with an annular centering rim D which engages with a correspondingly shaped rabbet *d* in the face of the other body section for keeping these parts in alinement while adjusting the same about the axis of the rotary joint between the same.

Various means may be employed for adjustably connecting the body sections, one of the means for this purpose shown in Figs. 1-4 of the drawings being constructed as follows: In the flange of one of the body sections is formed an annular undercut groove which is concentric with the axis about which the sections are rotated for adjustment and consists of a wide or enlarged inner portion E arranged wholly within the rim and a reduced or narrow outer portion *e* which opens out through the front side or face of the flange. F represents a plurality of coupling or clamping bolts each of which is arranged with its body in the narrow portion of the undercut groove and in an opening *f* formed in the flange of the other body section parallel to the adjusting axis and having its head arranged in the enlarged part of the undercut groove while its nut bears against the rear side of the flange having the bolt opening *f*, as shown in Fig. 1. Upon loosening the nuts of these bolts the two body sections may be rotated about their adjusting axis for bringing their shanks into the required angular position after which these parts are held in this position by tightening the nuts of the clamping bolts.

If desired the nuts of the bolts may be arranged in the enlarged portion of the undercut groove and their heads may bear against the rear side of the flange having the bolt openings, as shown in Fig. 5.

The enlarged part of the undercut groove is preferably of such width that one or both of its sides engage with one or both sides of the head or nut of the bolt arranged therein and thus prevent the same from turning while tightening the nut on the bolt or while screwing the bolt into the nut. Although four coupling or clamping bolts are shown in the drawings for connecting the flanges of the body sections it is obvious that a greater or less number may be employed.

*g* represents an opening leading from the enlarged part of the undercut groove through the rear side of the flange in which this groove is formed. This opening is made sufficiently large to permit the bolt head to be passed from the rear side of the grooved flange through the inlet opening and into the undercut groove, as shown in Fig. 1, or the nut of the bolt may be thus passed through this inlet opening into the undercut groove, as shown in Fig. 5.

My improved pipe coupling is simple and durable in construction and capable of being readily adjusted into the various positions required to fit the pipes to be coupled without necessitating bending or shifting of the same as has been necessary when using the couplings as heretofore constructed. Furthermore by curving the neck of each body section between the shank and its flanged end the diameter of this part of the conduit may be made of the same size as the remaining parts of the conduit, as shown, thus avoiding any contraction in the conduit and permitting a free flow through all parts of the same.

I claim as my invention:

A pipe coupling comprising two body sections each of which has an oblique face at its front end and an annular flange around said face arranged at the same angle, one of said sections having its flange provided with one or more bolt openings parallel to its adjusting axis and the other section having an annular undercut groove which opens with its contracted or narrow portion through the front side of the respective flange and a bolt inlet opening extending from said groove through the back of the flange, and one or more bolts each arranged with its body in one of the bolt openings and the contracted part of said groove while its head and nut are arranged one in the enlarged part of said groove and the other engaging with the rear side of the flange containing the bolt openings, substantially as set forth.

Witness my hand this 30th day of June, 1906.

MILES A. CONNOR.

Witnesses:
SETH M. HALL,
THEO. L. POPP.